(12) United States Patent
Guo

(10) Patent No.: US 10,896,651 B2
(45) Date of Patent: Jan. 19, 2021

(54) METHOD FOR DISPLAYING A DISPLAY PANEL

(71) Applicant: WUHAN CHINA STAR OPTOELECTRONICS TECHNOLOGY CO., LTD., Hubei (CN)

(72) Inventor: Yunlong Guo, Hubei (CN)

(73) Assignee: WUHAN CHINA STAR OPROELECTRONICS TECHNOLOGY CO., LTD., Wuhan (CN)

(*) Notice: Subject to any disclaimer, the term of this patent is extended or adjusted under 35 U.S.C. 154(b) by 0 days.

(21) Appl. No.: 16/473,200

(22) PCT Filed: Apr. 25, 2019

(86) PCT No.: PCT/CN2019/084174
§ 371 (c)(1),
(2) Date: Jun. 24, 2019

(87) PCT Pub. No.: WO2020/133843
PCT Pub. Date: Jul. 2, 2020

(65) Prior Publication Data
US 2020/0258461 A1   Aug. 13, 2020

(30) Foreign Application Priority Data

Dec. 29, 2018 (CN) .......................... 2018 1 1638889

(51) Int. Cl.
*G09G 3/36*        (2006.01)
*G01K 7/22*        (2006.01)
(Continued)

(52) U.S. Cl.
CPC ............. *G09G 3/3648* (2013.01); *G01K 7/22* (2013.01); *G02F 1/1368* (2013.01); *G02F 1/133382* (2013.01); *G09G 2320/041* (2013.01)

(58) Field of Classification Search
CPC ......... G09G 2300/041; G09G 3/36487; G01K 7/22; G02F 1/133382; G02F 1/1368
See application file for complete search history.

(56) References Cited

U.S. PATENT DOCUMENTS

2003/0011735 A1* 1/2003 Kato .................. G02F 1/13452
                                                       349/149
2007/0182694 A1  8/2007 Lee et al.
(Continued)

FOREIGN PATENT DOCUMENTS

CN         102982778 A      3/2013
CN         103871385 A      6/2014
(Continued)

*Primary Examiner* — Hong Zhou

(57) ABSTRACT

The present disclosure provides a method for displaying a display panel which includes determining corresponding register values of selected groups of thin film transistors according to respective characteristics of the thin film transistors at different temperatures; writing the register values into a system; adopting, by the system, the corresponding register value according to a working temperature. Therefore, the system will select and adopt the corresponding register value from a register according to a real-time working temperature of the display panel, thereby reducing shift of optical parameters of a liquid crystal screen and improving displays of the screen.

14 Claims, 2 Drawing Sheets determining register values of selected groups of thin film transistors at different temperatures —S100 writing the obtained register values into a system of a whole machine —S110 real-time detecting a temperature of a display panel by a detecting device —S120 adopting a corresponding register value according to the temperature of the display panel —S130

(51) Int. Cl.
    *G02F 1/1333*     (2006.01)
    *G02F 1/1368*     (2006.01)

(56) References Cited

U.S. PATENT DOCUMENTS

| | | | | |
|---|---|---|---|---|
| 2008/0309609 | A1* | 12/2008 | Feng | G09G 3/3677 345/101 |
| 2011/0062435 | A1* | 3/2011 | Yamazaki | H01L 29/7869 257/43 |
| 2016/0178705 | A1* | 6/2016 | Stirk | H02J 7/00 324/431 |
| 2016/0358579 | A1* | 12/2016 | Wang | G09G 3/3696 |
| 2017/0162144 | A1* | 6/2017 | Chen | G09G 3/3648 |
| 2018/0059470 | A1* | 3/2018 | Nam | G09G 3/2092 |
| 2018/0322830 | A1* | 11/2018 | Xu | G09G 3/006 |
| 2019/0025134 | A1* | 1/2019 | Ju | G06F 1/203 |

FOREIGN PATENT DOCUMENTS

| | | |
|---|---|---|
| CN | 106710567 A | 5/2017 |
| KR | 20050102886 A | 10/2005 |

\* cited by examiner

Annotated Sheet

METHOD FOR DISPLAYING A DISPLAY PANEL

FIELD OF INVENTION

The present disclosure relates to a field of display technology, and particularly to a method for displaying a display panel.

BACKGROUND

With appearance of thin film transistor (TFT) liquid crystal display (LCD) panels, they have been quickly accepted by the public and widely applied in various fields for its advantages of simplicity, lightness, true color, high color saturation and fast response times, etc.

With continuous development of display technology, people's requirements for display of a screen are constantly increasing. In an adjustment process of liquid crystal panel display technology, an adjustment of a register inside a driving integrated circuit (IC) mainly includes flicker, gamma value, and color coordinates. Usually, the driving IC is adjusted under a condition of normal temperature of 25° C. A working temperature of the adjusted IC ranges from 0 to 50° C. However, we all know that when the driving IC is working, the temperature changes. When the working temperature of the driving IC exceeds 50° C., the aforementioned optimal optical parameters will become inaccurate. For example, at high temperature, the flicker will drift and the gamma value will deviate from a target value by 2.2. If the driving IC still adjusts the screen according to preset parameters, optical parameters of the liquid crystal screen will shift, optical effect of the screen will be problematic, and the display will be unsatisfactory.

When the working temperature of the display panel is high, existing adjustment process of a driving IC register cannot meet usage requirement, easily resulting in shift of the optical parameters of the liquid crystal screen and decrease of optical performance of the screen, which are not conducive to the display of the panel. Therefore, there is a need to propose a further perfected and improved solution.

SUMMARY OF DISCLOSURE

The present disclosure provides a method for displaying a display panel in order to solve the technical problem, in the prior art, that optical parameters of a liquid crystal screen shift at a high temperature, and thus display is not satisfactory.

To solve the aforementioned technical problem, the present disclosure provides a technical solution as below:

according to a first aspect of the present disclosure, a method for displaying a display panel is provided, comprising the steps of:

S100: determining register values of selected groups of thin film transistors according to respective characteristics of the thin film transistors at different temperatures;

S110: writing multiple groups of the register values obtained in step S100 into a system;

S120: detecting a working temperature of the display panel by a detecting device; and S130: adopting, by the system, a corresponding register value according to the temperature detected in the step S120;

wherein, in the step S100, the temperature ranges from −30° C. to 70° C.;

the step S100 further comprises: dividing the groups of thin film transistors into a low temperature group of thin film transistor having a temperature range of −30-0° C., a medium temperature group of thin film transistor having a temperature range of 0-50° C. and a high temperature group of thin film transistor having a temperature range of 50-70° C.

According to an embodiment of the present disclosure, in the step S100, the number of the thin film transistors in each group is plural.

According to an embodiment of the present disclosure, the method further comprises step S101: averaging the register values obtained in each group of the thin film transistors.

According to an embodiment of the present disclosure, in the step S120, the detecting device is a thermistor.

According to an embodiment of the present disclosure, the display panel further comprises a soft plate, the thermistor is fixed on the soft plate of the display panel, the display panel is connected to the system by the soft plate to obtain the temperature detected in the step S120.

According to an embodiment of the present disclosure, the soft plate is a flexible circuit plate.

According to an embodiment of the present disclosure, the soft plate is used for conversion and transmission of a voltage signal.

According to a second aspect of the present disclosure, a method for displaying a display panel is further provided, comprising the steps of:

S200: determining register values of selected groups of thin film transistors according to respective characteristics of the thin film transistors at different temperatures;

S210: writing multiple groups of the register values obtained in step S200 into a system;

S220: detecting a working temperature of the display panel by a detecting device; and S230: adopting, by the system, a corresponding register value according to the temperature detected in the step S220.

According to an embodiment of the present disclosure, in the step S200, the number of the thin film transistors in each group is plural.

According to an embodiment of the present disclosure, the method further comprises:

step S300: averaging the register values obtained in each group of the thin film transistors.

According to an embodiment of the present disclosure, in the step S220, the detecting device is a thermistor.

According to an embodiment of the present disclosure, the display panel further comprises a soft plate, the thermistor is fixed on the soft plate of the display panel, the display panel is connected to the system by the soft plate to obtain the temperature detected in the step S220.

According to an embodiment of the present disclosure, the soft plate is a flexible circuit plate.

According to an embodiment of the present disclosure, the soft plate is used for conversion and transmission of a voltage signal.

According to an embodiment of the present disclosure, in the step S200, the temperature ranges from −30° C. to 70° C.

According to an embodiment of the present disclosure, in the step S200, the groups of thin film transistors are divided into a low temperature group of thin film transistor having a temperature range of −30-0° C., a medium temperature group of thin film transistor having a temperature range of 0-50° C. and a high temperature group of thin film transistor having a temperature range of 50-70° C.

The beneficial effect of the present disclosure is that:

an embodiment of the present disclosure provides a method for displaying a display panel, which determines characteristics of a thin film transistor under different temperature conditions to obtain a register value, and then writes the register value into a system of a whole machine in advance; when the whole machine is working normally, the system of the whole machine will adopt a corresponding register value from a register according to the real-time working temperature of the display panel, thereby reducing the shift of the optical parameters of the liquid crystal screen and improving the display of the screen.

BRIEF DESCRIPTION OF DRAWINGS

In order to more clearly illustrate the technical solutions in the embodiments of the present disclosure or the prior art, a brief description of accompanying drawings used in the description of the embodiments of the present disclosure or the prior art will be given below. Obviously, the accompanying drawings in the following description are merely some embodiments of the present disclosure. For those skilled in the art, other drawings may be obtained from these accompanying drawings without creative labor.

DETAILED DESCRIPTION

The technical solutions in the embodiments of the present disclosure will be clearly and completely described below in conjunction with the accompanying drawings in the embodiments of the present disclosure. It is apparent that the described embodiments are merely a part of the embodiments of the present disclosure, and not all embodiments. All other embodiments obtained by those skilled in the art based on the embodiments of the present disclosure without creative labor are within the claimed scope of the present disclosure.

In the description of the present disclosure, it needs to be understood that the indicated orientation or positional relationship is based on the orientation or positional relationship shown in the accompanying drawings, and is merely for the convenience of the description of the present disclosure and the simplification of the description. Furthermore, the terms "first" and "second" are merely used for descriptive purposes and should not to be construed as indicating or implying a relative importance or implicitly indicating the number of the indicated technical features. The present disclosure provides examples of various specific processes and materials, but those skilled in the art can be aware of the application of other processes and/or the use of other materials.

The traditional method for optimizing optical display is to adjust display by adjusting a driving voltage on a driving integrated circuit on a panel. In order to obtain the register value required for the display panel, the measurement of which is usually carried out in a normal temperature environment, that is, in the range of 25° C. But, when the display panel is working, the working temperature is not constant and not always 25° C. However, the optimum register code obtained at normal temperature is only suitable for the temperature range of the normal temperature environment. When the working temperature of the display panel exceeds the limited temperature range, if the driving integrated circuit is still operated according to the fixed register value obtained above, severe distortion will occur, and the data parameters will also significantly shift, thereby affecting display.

Figure 1:
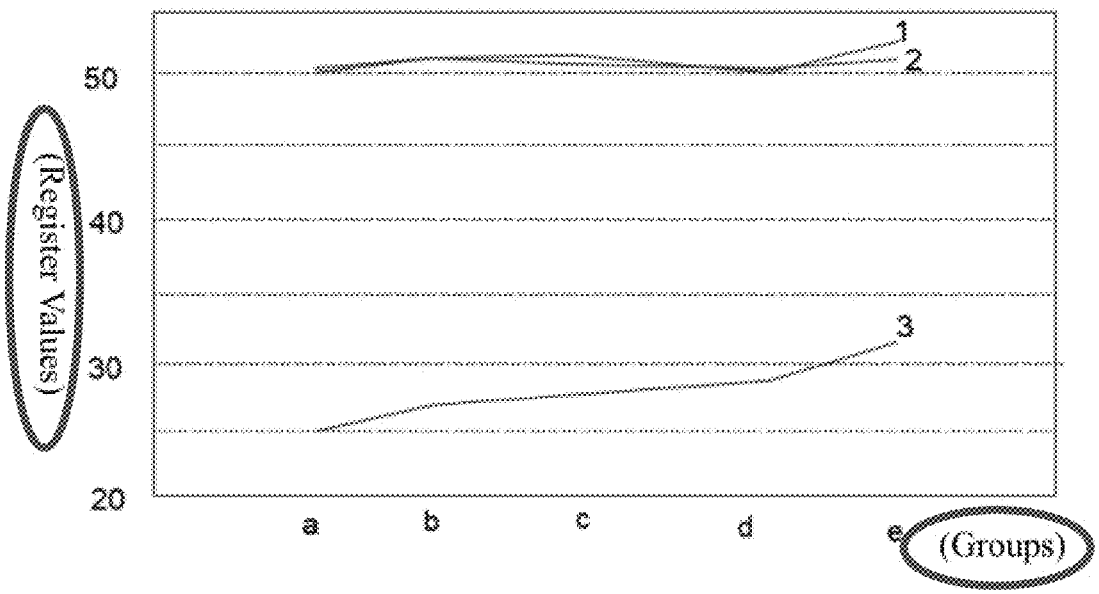
FIG. 1 is a curve diagram showing Flicker values of a display panel as a function of temperature at different ambient temperatures.

An embodiment of the present disclosure provides a method for displaying a display panel. Please refer to FIG. 1, which is a curve diagram showing flicker values of a display panel as a function of temperature at different ambient temperatures. In this embodiment, several groups of thin film transistors within different ambient temperature ranges are selected as experimental samples, the selected samples are divided into five groups, a, b, c, d and e, and there are three samples in each group. The experimental temperatures are selected to be 25° C., 40° C. and 60° C., respectively. In the FIG. 1, curve 1 is the experimental data measured at 25° C., curve 2 is the experimental data measured at 40° C., and curve 3 is the experimental data measured at 60° C. It can be seen that when the ambient temperature is 0-50° C., the changes in curve 1 and curve 2 are almost the same and are all near the same horizontal position. At this time, the register values obtained by curve 1 and curve 2 are input to a register. When the working temperature of the display panel is also in the range of 0-50° C., a whole machine can directly invoke the register value and perform an operation, the register value has little influence on optical parameters, and the display of the display panel is good.

When the temperature is raised to 60° C., the characteristics of the panel TFT and the optical materials change under a high temperature environment, resulting in the change of optical parameters. It is found that the numerical parameters of curve 3 shifted down as a whole, which greatly differs from the curve 1 and curve 2. At this time, the measured register value of curve 3 greatly differs from that of curve 1 and curve 2. If the working temperature of the display panel is 60° C. or higher, while the input register value is still in accordance with the fixed register value measured in curve 1 and curve 2, the optical parameters of the display panel will shift, thereby affecting the display.

Figure 2:
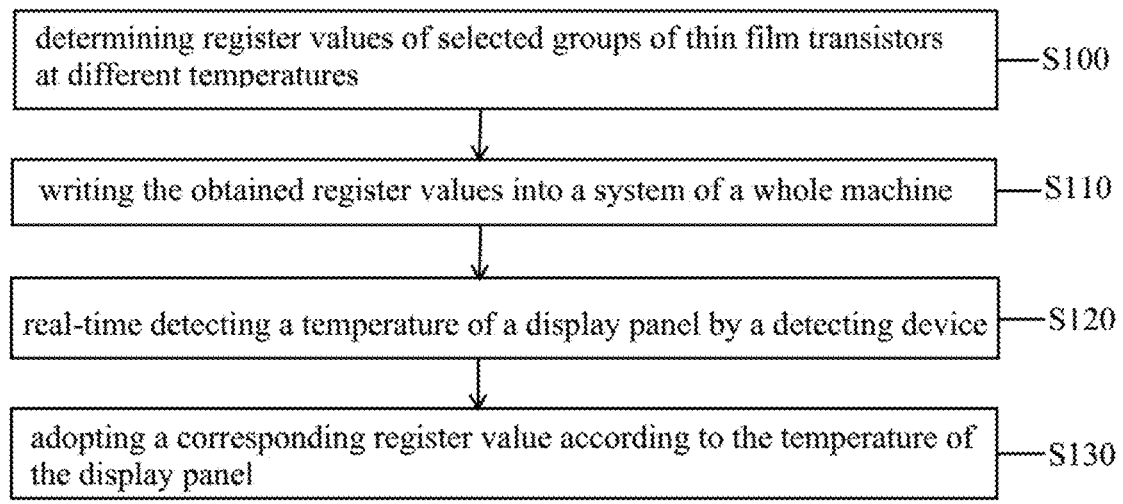
FIG. 2 is a process flow diagram of a method for displaying a display panel according to an embodiment of the present disclosure.

Specifically, an embodiment of the present disclosure provides an improved method for displaying a display panel. Please refer to FIG. 2, which is a process flow diagram of an embodiment of the present disclosure, comprising the steps of:

S100: determining corresponding register values of selected groups of thin film transistors according to respective characteristics of the thin film transistors at different temperatures;

S110: writing multiple groups of the register values obtained in step S100 into a system in advance;

S120: real-time detecting a working temperature of the display panel by a detecting device; and S130: adopting, by the system, a corresponding register value according to the temperature detected in the step S120.

In the step S100, number of the thin film transistors in each selected group is plural. The register values obtained in each group are averaged to obtain an average value as a register value, in order to reduce error of experimental measurement. At the same time, in the step S120, the detecting device may be a thermistor, the detecting device further comprises a soft plate, the thermistor is fixed on the soft plate of the liquid crystal display module, and the soft plate is a flexible circuit plate, used for converting and transmitting a voltage signal.

Figure 3:
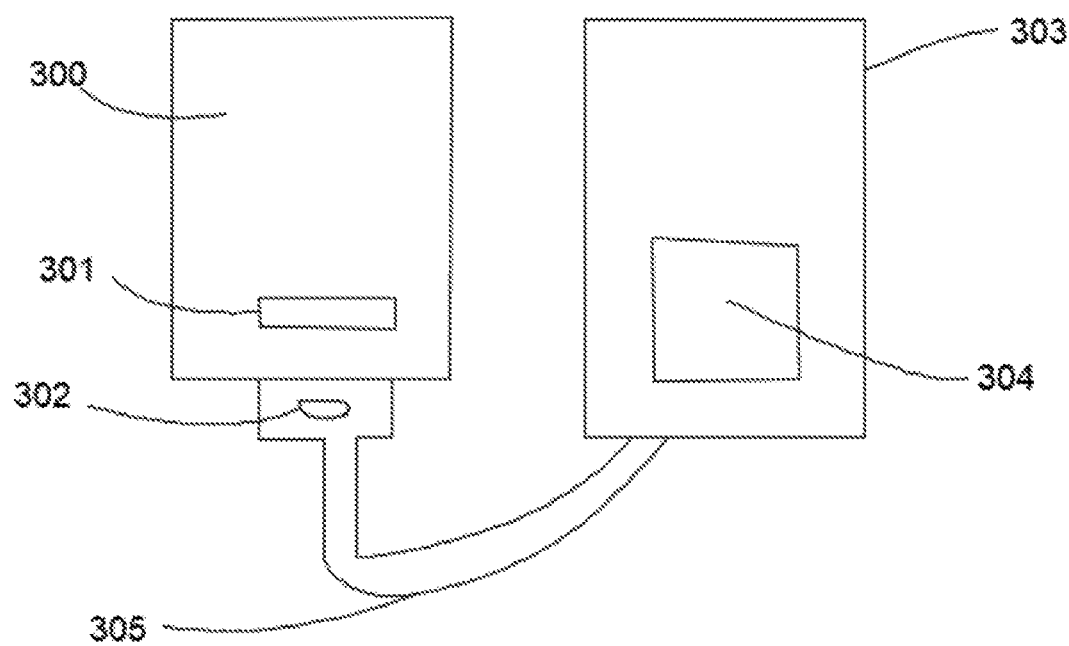
FIG. 3 is a schematic diagram of working components in an embodiment of the present disclosure.

Please refer to FIG. 3, which is a schematic diagram of working components in an embodiment of the present disclosure, comprising a display panel 300, a driving integrated circuit 301, a thermistor 302, a system 303, a register 304 and a soft plate 305. The display panel 300 is connected to the system 303 by the soft plate 305. The driving integrated circuit 301 is disposed in the display panel 300. The thermistor 302 is further disposed on the soft plate 305. The register 304 is disposed in the system 303 and used for registering register values. In a specific operation, for example, a first step: dividing selected 15 samples of thin film transistor into 3 groups of 5 samples each. A measurement is carried out in the temperature range of −30° C. to 70° C. The three groups are a normal temperature group having a temperature range of 0-50° C., a high temperature group having a temperature range of 50-70° C. and a low temperature group having a temperature range of −30-0° C.

A second step: in the measurement, determining the optical parameters such as Flicker, gamma or color coordinates in various intervals at intervals of 10° C. for each sample under room temperature from −30° C. to 70° C. After obtaining the data, the optical parameters are analyzed to determine the range of stability of the optical parameters of each group.

A third step: recording the register value of the normal temperature group as code 1, the register value of the high temperature group as code 2, and the register value of the low temperature group as code 3. Then, the register values code 1, code 2 and code 3 are disposed in their respective temperature environments, and the corresponding optical parameters are tested for verification. After the verification is satisfied, the code 1, code 2 and code 3 are burned into a system of a whole machine.

In this way, when the display panel is in different working temperature environments, the whole machine can real-time monitor the temperature of the panel by the thermistor disposed on the soft plate, and can adopt the corresponding register value from code 1, code 2 or code 3, thereby reducing the shift of the optical parameters, and then improving the display.

A method for improving the display of the display panel provided by the embodiment of the present disclosure is described in detail above. The above description of the embodiments is only for helping to understand the technical solutions of the present disclosure and its core ideas. It should be understood by those skilled in the art that they can still modify the technical solutions recited in the foregoing embodiments, and these modifications or substitutions do not depart from the scope of the technical solutions of the embodiments of the present disclosure.

What is claimed is:

1. A method for displaying a display panel, comprising the steps of:
    S100: determining register values of selected groups of thin film transistors according to respective characteristics of the thin film transistors at different temperatures;
    S110: writing multiple groups of the register values obtained in step S100 into a system;
    S120: detecting a working temperature of the display panel by a detecting device; and
    S130: adopting, by the system, a corresponding register value according to the temperature detected in the step S120;
    wherein, in the step S100, the temperature ranges from −30° C. to 70° C.;
    the step S100 further comprises: dividing the groups of thin film transistors into a low temperature group of thin film transistor having a temperature range of −30-0° C., a medium temperature group of thin film transistor having a temperature range of 0-50° C. and a high temperature group of thin film transistor having a temperature range of 50-70° C.

2. The method for displaying a display panel according to claim 1, wherein, in the step S100, the number of the thin film transistors in each group is plural.

3. The method for displaying a display panel according to claim 2, further comprising:
    step S101: averaging the register values obtained in each group of the thin film transistors.

4. The display method of the display panel according to claim 1, wherein, in the step S120, the detecting device is a thermistor.

5. The display method of the display panel according to claim 4, wherein the display panel further comprises a soft plate, the thermistor is fixed on the soft plate of the display panel, the display panel is connected to the system by the soft plate to obtain the temperature detected in the step S120.

6. The method for displaying a display panel according to claim 5, wherein the soft plate is a flexible circuit plate.

7. The method for displaying a display panel according to claim 5, wherein the soft plate is used for conversion and transmission of a voltage signal.

8. A method for displaying a display panel, comprising the steps of:
    S200: determining register values of selected groups of thin film transistors according to respective characteristics of the thin film transistors at different temperatures;
    S210: writing multiple groups of the register values obtained in step S200 into a system;
    S220: detecting a working temperature of the display panel by a detecting device; and
    S230: adopting, by the system, a corresponding register value according to the temperature detected in the step S220;
    wherein, in the step S200, the groups of thin film transistors are divided into a low temperature group of thin film transistor having a temperature range of −30-0° C., a medium temperature group of thin film transistor having a temperature range of 0-50° C. and a high temperature group of thin film transistor having a temperature range of 50-70° C.

9. The method for displaying a display panel according to claim 8, wherein, in the step S200, the number of the thin film transistors in each group is plural.

10. The method for displaying a display panel according to claim 9, further comprising:
    Step S300: averaging the register values obtained in each group of the thin film transistors.

11. The display method of the display panel according to claim 8, wherein, in the step S220, the detecting device is a thermistor.

12. The display method of the display panel according to claim 11, wherein the display panel further comprises a soft plate, the thermistor is fixed on the soft plate of the display panel, the display panel is connected to the system by the soft plate to obtain the temperature detected in the step S220.

13. The method for displaying a display panel according to claim 12, wherein the soft plate is a flexible circuit plate.

14. The method for displaying a display panel according to claim 12, wherein the soft plate is used for conversion and transmission of a voltage signal.

\* \* \* \* \*